United States Patent [19]

Gruhl et al.

[11] Patent Number: 4,992,404

[45] Date of Patent: Feb. 12, 1991

[54] CARBON-BASED CATALYST USEFUL IN GAS-SOLID REACTIONS

[75] Inventors: Siegfried Gruhl, Engelskirchen; Werner Pusch, Leverkusen; Siegbert Humberger; Goetz-Gerald Börger, both of Odenthal-Osenau, all of Fed. Rep. of Germany

[73] Assignee: Bayer Aktiengesellschaft, Leverkusen, Fed. Rep. of Germany

[21] Appl. No.: 470,021

[22] Filed: Jan. 25, 1990

Related U.S. Application Data

[63] Continuation of Ser. No. 227,953, Aug. 3, 1988, abandoned.

[30] Foreign Application Priority Data

Aug. 19, 1987 [DE] Fed. Rep. of Germany ....... 3727642

[51] Int. Cl.$^5$ .................. B01J 21/18; B01J 23/22; B01J 23/74; B01J 23/72
[52] U.S. Cl. ................... 502/185; 502/182; 502/184
[58] Field of Search ............ 502/180, 182, 181, 185, 502/416, 417, 429; 264/29.3, 29.5, 29.7; 208/184

[56] References Cited

U.S. PATENT DOCUMENTS

| | | | |
|---|---|---|---|
| 3,755,193 | 8/1973 | Luft et al. | 502/180 |
| 3,795,730 | 3/1974 | Kalvinskas | 502/182 |
| 3,953,345 | 4/1976 | Saito et al. | 502/427 |
| 4,045,368 | 8/1977 | Katori et al. | 502/416 |
| 4,085,193 | 4/1978 | Nakajima et al. | 423/239 |
| 4,113,839 | 9/1978 | Maki | 502/417 |
| 4,118,341 | 10/1978 | Ishibashi et al. | 502/437 |
| 4,197,272 | 4/1980 | Tighe | 502/180 |

FOREIGN PATENT DOCUMENTS

| | | | |
|---|---|---|---|
| 2911712 | 9/1980 | Fed. Rep. of Germany . | |
| 139880 | 10/1979 | Japan | 502/437 |
| 7409500 | 1/1975 | Netherlands | 423/239 A |

*Primary Examiner*—Paul E. Konopka
*Attorney, Agent, or Firm*—Sprung Horn Kramer & Woods

[57] ABSTRACT

A carbon-based catalyst which has a carbon content of >65% by weight and a content of substantially insoluble oxides of the metals Co, Fe, Ni, Cr, V, Mo, W, Cu, Mn and Ti of, in all, 0.1% by weight and a nitrogen content of 0.2 to 5% by weight. These catalysts are produced by a process wherein an organic material comprising unsaturated carbon-carbon bonds is pyrolyzed in a first step via the liquid phase stage, the product formed is size-reduced after cooling, mixed with substantially insoluble metal oxides and/or compounds forming substantially insoluble metal oxides together with binders and, optionally, water and the resulting mixture subjected to forming and heat treatment. The catalysts are useful in various gas-solid reactions more especially for the reductive destruction of nitrogen oxides in smoke gases.

7 Claims, No Drawings

CARBON-BASED CATALYST USEFUL IN GAS-SOLID REACTIONS

This is a continuation of application Ser. No. 227,953, filed Aug. 3, 1988, now abandoned.

This invention relates to a carbon-based catalyst, to processes for the production of the catalyst and to the use of the catalyst.

Certain materials, such as inorganic oxides for example, are desirable as large-surface supports for catalytically active materials. In many catalytic processes, particularly those involving gas-solid reactions, the optimal catalytic activity of such materials doped with corresponding catalytically active elements is only reached at relatively high temperatures. Thus, the reductive destruction of nitrogen oxides by the SCR (selective catalytic reduction) process preferably takes place at temperatures above 300° C. which, in some cases, necessitates uneconomic reheating of the gases. In addition, the catalysts suitable for such processes (DE-C No. 2 458 888 = U.S. Pat. No. 4,085,193) are expensive to produce.

The catalytic degradation of $NO_x$ with ammonia on active coke, which may be carried out at relatively low temperatures, is also known (cf. DE-A No. 2 911 712). However, the disadvantage of this process lies in the fact that very large quantities of coal are required. Thus, a 300 MW power station has an active coke demand of around 50 t/a and an initial supply of around 500 t.

The object of the present invention is to provide a catalyst material which does not have any of the disadvantages mentioned above.

A material which outstandingly satisfies these requirements has now surprisingly been found.

The present invention relates to a carbon-based catalyst which is characterized in that it has a carbon content of >65% by weight and a content of substantially insoluble oxides of the metals Co, Fe, Ni, Cr, V, Mo, W, Cu, Mn and Ti of, in all ,0.1 to 10% by weight and a nitrogen content of 0.2 to 5% by weight.

In one preferred embodiment, the carbon contents of the catalyst is 80 to 98% by weight. Depending on the field of application of the catalyst, even a very small content of catalytically active metals may be sufficient. The metals are also chosen according to the field of application of the catalyst. A metal oxide content of 0.5 to 5% by weight is generally preferred.

The catalyst according to the invention is a substantially homogeneous material. Accordingly, the metal oxide component cannot be physically separated from the carbon matrix. In one particularly preferred embodiment, the metal oxides are at least partly present in the crystallized spinel form. Thus, even where the metal oxide content is very small, the spinel component may be detected using a Debye-Scherrer diffractometer.

The present invention also relates to processes for producing the catalyst according to the invention. In one of these processes, an organic material comprising unsaturated carbon-carbon bonds is pyrolized in a first step via the liquid phase stage, the product formed is size-reduced after cooling, mixed with substantially insoluble metal oxides and/or compounds forming substantially insoluble metal oxides together with binders and, optionally, water and the resulting mixture subjected to forming and heat treatment.

For certain applications of the catalyst, it can be useful if the organic materials additionally contain nitrogen. The organic material sued preferably has a carbon content of >65% by weight and a nitrogen content of >1% by weight and preferably from 2 to 15% by weight.

Suitable organic compounds are, in particular, polymers formed by bonding of monomers by polyaddition, polycondensation and/or polymerization.

One particularly economic advantage of the process according to the invention lies in the fact that secondary products of carbon chemistry and carbon-nitrogen chemistry, more especially distillation residues, may be used as the organic material. These secondary products may be monomeric or polymeric residues from the production of isocyanates, amines, nitriles, polyurethanes, etc. These residues may thus be put to effective use. The organic material is first introduced into a pyrolysis reactor in liquid for pre-size-reduced solid form. A particularly suitable pyrolysis reactor is a pyrolysis screw conveyor. The organic material is then pyrolized at temperatures above 200° C. The pyrolysis temperature to be selected naturally depends upon the particular organic material used and may be as high as 800° C.

The volatile products which accumulate during the pyrolysis process are removed and may be burnt to recovery energy. The cooled pyrolysis residue is then mechanically size-reduced and mixed with the binder and the metal oxides or with compounds forming metal oxides under the reaction conditions. Preferred binders are phenol, cresols, xylenols and/or naphthols which may be used either individually or in admixture with or condensed with formaldehyde, methaldehyde and/or benzaldehyde. It is particularly effective to add the formaldehyde in the form of hexamethylene tetramine (urotropin). Again, it does not matter whether these binders are used in pure form or, particularly economically, as secondary products.

In one particularly preferred embodiment of the process according to the invention, the metal oxides or compounds forming metal oxides are those of the metals Co, Fe, Ni, Cr, V, Mo, W, Cu, Mn and Ti and are added in quantities of 0.1 to 10% by weight, expressed as metal oxide. This mixture is preferably homogenized in a screw and then subjected to forming and thus reduced to the required particle size and shape. This is done in known units, such as extrusion presses and extruders. Finally, the product thus obtained is subjected to the final heat treatment. According to the invention, the heat treatment comprises the steps of drying and treatment with steam. Drying is generally carried out in an oxygen containing atmosphere at temperatures of 150° to 300° C. and lasts about 1 to 5 hours. The dried product is then subjected, optionally after calcination for several hours in an inert gas atmosphere, to treatment with steam for several hours at temperatures of 600° to 900° C.

The catalyst according to the invention produced in this was are highly abrasion-resistant and of high catalytic activity. Their compact density is generally above 400 kg/m³.

The catalyst is eminently suitable for various gas-solid reactions. It shows particularly good results in the reductive destruction of nitrogen oxides in flue gases where the still detectable content of carbon-nitrogen bonds could be of influence.

Accordingly, the present invention also relates to the use of the catalyst for catalytic gas-solid reactions and more especially for the reductive destruction of nitrogen oxides in flue gases. In contrast to known SCR catalysts, optimal activity is developed at temperatures of only 80° to 150° C. In addition, the spent catalyst material may readily be eliminated by burning.

The following Examples are intended to illustrate the invention without limiting it in any way.

EXAMPLE 1

(a) 10kg C-N-containing organic material from the distillation residue of PU (polyurethane) production process, which has been inactivated with $H_2O$, are continuously introduced via a metering screw into a continuous screw extruder. The screw extruder is electrically heated to a working temperature of at most 670° C. The material is pyrolyzed for about 15 minutes in the extruder, passing through a viscous melt phase. The product formed (4.6 kg) is discharged as a loose material and cooled. The pyrolysis gases are burnt.

(b) For further processing, 2.5 kg of the product described above are ground for 20 hours in a ball mill (sieve residue DIN 80, approx. 1% >0.071 mm).

The ground product (2.5 kg) is introduced into a laboratory mixer. 0.46 kg liquid distillation residue (isomer mixtures of hydroxyditolylene and ditolylene) from the production of cresol and 0.185 kg aqueous urotropin (hexamethylene tetramine) solution (26%) prepared from 37% $CH_2O$ solution and $NH_3$, in which 18 g $V_2O_5$ have been suspended, are then added.

After thorough homogenization for 30 minutes, the mixture formed (3.15 kg) is formed into moist shaped elements in a laboratory press. The shaped elements (diameter 4 mm, length 5 to 10 mm) and heat treated for about 3 hours at 250° to 300° C. in a drying cabinet. The dried material is heated for 3 to 4 hours to 750° C. in a stream of nitrogen (500 l/h) in an electrically heated rotating tube furnace and is kept at that temperature for 0.5 hour.

The calcined product is then treated for 7 to 8 hours at 800° C. in a stream of steam (1 kg/h steam) in the same furnace.

After cooling of the furnace, approx. 1 kg catalyst having the following specific data is obtained:
C=85.8% by weight
H=1.5% by weight
N=2.1% by weight
V=0.6% by weight
oxidic component=4.5% by weight
compact density (kg/m$^3$) 485
shaped element $\phi$ 3.8 mm
BET 1,020 m$^2$/g (as determined by the $N_2$ method)
mean pore diameter: 290 $\mu$m
compression hardness 18 kp.

EXAMPLE 2

The intermediate product was produced as described in Example 1a).

The cooled product is size-reduced by kneading elements on issuing from the screw extruder and ground for 3 hours in a ball mill.

The ground product (2 kg) is homogenized with 16 g (Cu acetate and with 0.5 kg of the polyester resin Crelan ® U 502 (hydroxyl-containing, oil-free, saturated terephthalatebased polyester; a product of Bayer AG) in a screw kneader and is extruded from the screw in the form of 4 mm cylindrical granulate.

A heat treatment was carried out for 3 hours at 280° C. in an electrically heated rotating tube furnace using 500 l/h $N_2$ and 100 l/h air, after which the furnace was heated to a temperature of 680° C. with the air supply shut off.

The product was then heated under nitrogen to 750° C. and kept at that temperature for 30 minutes (yield 1.5 kg). After calcination, the product was treated with steam (1 kg/h) at 800° C. (yield 0.6 kg).

The catalyst had the following specific data:
C=86.5by weight
H=1.4% by weight
N=1.7% by weight
Cu=0.4% by weight
oxidic component=4.1% by weight
compact density (kg/m$^3$) 446
molding $\phi$ 3.6 mm.
BET 950 m$^2$/g (as determined by the $N_2$ method)
mean pore diameter: 300 $\mu$m
compression hardness 14.

What is claimed is:

1. A carbon-based catalyst produced by a process comprising a first step of pyrolyzing a monomeric or polymeric residue from the production of isocyanates, amines, nitriles or polyurethanes, cooling the pyrolysis product formed and size-reducing the cooled pyrolysis product, mixing the size-reduced pyrolysis product with substantially insoluble metal oxide and/or compounds forming substantially insoluble metal oxides and a binder for said pyrolysis product/metal oxide mixture said binder being selected from the group consisting of phenol, cresols, xylenols, naphthols or mixtures of phenol, cresols, xylenols, and naphthols admixed with or condensed with formaldehyde, methaldehyde, benzaldehyde or mixtures of formaldehyde, methaldehyde and benzaldehyde and subjecting the resulting mixture to forming and heat treatment at a temperature of at least 600° C. to obtain a substantially homogeneous catalyst of said metal oxides bound to a carbon matrix, wherein said catalyst of pyrolysis product, insoluble metal oxide and binders has a carbon content of >65% by weight of catalyst, a content of one or more of substantially insoluble oxides of the metals Co, Fe, Ni, Cr, V, Mo, W, Cu, Mn and Ti of 0.1 to 10% by weight of said catalyst and a nitrogen content of 0.5 to 15% by weight of catalyst.

2. A catalyst according to claim 1, wherein the metal oxides are at least partly present in the crystallized spinel form.

3. A catalyst according to claim 1, wherein the heat treatment comprises the steps of drying and treatment with steam.

4. A catalyst according to claim 1, wherein the nitrogen content is 2 to 15% by weight.

5. A catalyst according to claim 1, wherein the carbon content is 80 to 98% by weight of said catalyst.

6. A catalyst according to claim 1, wherein the metal oxide content is 0.2 to 5% by weight of said catalyst.

7. A catalyst according to claim 1, where the pyrolysis is conducted at temperatures above 200° C.

* * * * *